United States Patent
Keal (10) Patent No.: US 10,309,983 B2
(45) Date of Patent: Jun. 4, 2019

(54) SYSTEMS AND METHODS FOR MOTION DETECTION

(71) Applicant: InvenSense, Inc., San Jose, CA (US)

(72) Inventor: William Kerry Keal, Santa Clara, CA (US)

(73) Assignee: InvenSense, Inc., San Jose, CA (US)

( * ) Notice: Subject to any disclaimer, the term of this patent is extended or adjusted under 35 U.S.C. 154(b) by 67 days.

(21) Appl. No.: 15/461,761

(22) Filed: Mar. 17, 2017

(65) Prior Publication Data

US 2018/0267074 A1    Sep. 20, 2018

(51) Int. Cl.
*G01P 13/00* (2006.01)
*G01P 21/00* (2006.01)

(52) U.S. Cl.
CPC .............. *G01P 13/00* (2013.01); *G01P 21/00* (2013.01)

(58) Field of Classification Search
CPC ................................ G01P 13/00; G01P 21/00
See application file for complete search history.

(56) References Cited

U.S. PATENT DOCUMENTS

2012/0323520 A1* 12/2012 Keal ................. G01C 19/5776
                                                      702/141
2014/0188638 A1*  7/2014 Jones ..................... H04W 4/60
                                                       705/16

* cited by examiner

*Primary Examiner* — Toan M Le
(74) *Attorney, Agent, or Firm* — Bay Area Technology Law Group PC (57) ABSTRACT

Systems and methods are disclosed for characterizing motion of a device by taking the difference between pairs of sensor signal samples and comparing an expected higher order moment for the differences determined from an observed first order moment for the differences and/or an observed second order moment for the differences and the observed higher order moment for the differences. A determination of whether the device is experiencing motion may be made based on a comparison of the difference of the moments to a threshold.

32 Claims, 7 Drawing Sheets

SYSTEMS AND METHODS FOR MOTION DETECTION

FIELD OF THE PRESENT DISCLOSURE

This disclosure generally relates characterizing motion of a device using a sensor and more specifically to initiating the calibration of the sensor in an efficient manner.

BACKGROUND

The development of microelectromechanical systems (MEMS) has enabled the incorporation of a wide variety of sensors into mobile devices, such as cell phones, laptops, tablets, gaming devices and other portable, electronic devices. Non-limiting examples of such sensors include an accelerometer, a gyroscope, a magnetometer, a pressure sensor, a microphone, a proximity sensor, an ambient light sensor, an infrared sensor, and the like. Further, sensor fusion processing may be performed to combine the data from a plurality of sensors to provide an improved characterization of the device's motion or orientation. However, due to the nature of electronics and mechanics, MEMS-based sensors may be prone to having bias (offset) and sensitivity errors. These errors may drift and or change due to temperature, humidity, time, assembly stress and other changes in peripheral conditions. In turn, inaccurate bias may result in decreased quality of sensor data and may complicate the sensor fusion process used to estimate parameters such as attitude (e.g., pitch, roll, and yaw), heading reference and the like which are dependent on the precision of the sensors' outputs. For example, when integration of raw data output by the sensor is used to determine velocity from acceleration or orientation angle from the rate of angular change, the bias drift problem may be significantly magnified.

In light of these characteristics of MEMS sensors, it may be desirable to perform a sensor calibration operation to characterize the bias or sensitivity error, enabling a correction of the sensor data. A sensor calibration operation may employ mathematical calculations to deduce various motion states and the position or orientation of a physical system. A sensor bias may be produced by the calibration operation, which may then be applied to the raw sensor data and calibrate the sensor. As will be appreciated, certain calibration operations may be performed effectively when the device employing the sensor is not undergoing motion. Particularly for mobile devices that may rely on a battery for energy or may have limited computational abilities, the use of sensor fusion involving multiple sensor systems may represent an undesirably large portion of the resource budget. Accordingly, the techniques of this disclosure are directed to quickly determining when appropriate calibration conditions exist so that a corresponding operation may be performed efficiently. While the following discussion is in the context of MEMS sensors as used in portable devices, one of skill in the art will recognize that these techniques may be employed to any suitable sensor application as desired.

SUMMARY

As will be described in detail below, this disclosure includes a method for characterizing a motion of a device. The method may include obtaining a data signal from a motion sensor of the device, wherein the data signal comprises a plurality of samples provided at a sampling frequency, computing differences between pairs of the plurality of samples, performing a calculation corresponding to subtracting an expected higher order moment for the differences from an observed higher order moment for the differences to obtain a difference of the moments, wherein the expected higher order moment is based at least in part on an observed first order moment for the differences and an observed second order moment for the differences and determining whether the device is experiencing motion based at least in part on a comparison of the difference of the moments to a threshold.

In one aspect, the higher order moment may be a fourth order moment for the differences. The difference of the moments may be equal to the observed fourth order moment for the differences minus three times the observed second order moment for the differences squared. The higher order moment for the differences may be an even order moment greater than a fourth order moment for the differences.

In one aspect, the samples of each pair may be spaced a fixed number of samples apart. The spacing may be based at least in part on an expected frequency of motion of the device. The spacing may be configured to oppose the phase of the expected frequency of motion of the device. The fixed number of samples may be based at least in part on a reciprocal of the expected frequency of motion multiplied by the sampling frequency divided by two. The expected frequency of motion may be approximately 7 Hz.

In one aspect, the expected frequency of motion may be based at least in part on a use case for the device. The use case for the device may be determined based at least in part on a data signal from the motion sensor.

In one aspect, the samples of each pair are spaced a varying number of samples apart. The varying number of samples may correspond to a bandwidth associated with expected frequencies of motion.

The method may further include making an initial no motion determination by comparing a difference between two samples to a threshold. The threshold may be based at least in part on a standard deviation of the motion sensor.

In one aspect, an initial no motion determination may be based on an output of a different motion sensor.

In one aspect, the motion sensor may be determined to be working properly when the result of the subtraction may be within the threshold and it may be known the device may be not moving.

In one aspect, an accelerometer bias may be calculated when the result of the subtraction exceeds a threshold.

In one aspect, a behavior of a user of the device may be characterized based at least in part on the determination of whether the device may be experiencing motion.

In one aspect, the motion sensor may be a gyroscope. At least one parameter of the gyroscope may be calibrated. A gyroscope bias may be determined when the result of the subtraction may be within the threshold. A gyroscope temperature compensation learning term may be set when the result of the subtraction may be within the threshold.

In one aspect, the motion sensor may be an accelerometer.

In one aspect, the motion sensor may be a magnetometer.

This disclosure also includes a sensor device having at least one motion sensor outputting a data signal, wherein the data signal may be a plurality of samples provided at a sampling frequency and a motion detection module to compute differences between pairs of the plurality of samples, perform a calculation corresponding to subtracting an expected higher order moment for the differences from an observed higher order moment for the differences to obtain a difference of the moments, wherein the expected higher order moment may be based at least in part on an observed first order moment for the differences and an observed second order moment for the differences and determine whether the device may be experiencing motion based at least in part on a comparison of the difference of the moments to a threshold.

In one aspect, the motion sensor may be a gyroscope. The device may include a calibration module configured to determine at least a parameter of the gyroscope. The calibration module may determine a gyroscope bias when the result of the subtraction may be within the threshold.

In one aspect, the device further may have an additional motion sensor and the motion detection module may be further configured to make an initial motion detection before performing the calculation.

In one aspect, the at least one motion sensor and the motion detection module are implemented on a single substrate.

This disclosure is also directed to an integrated sensor processing unit characterizing a motion of a device that has at least one motion sensor outputting a data signal, wherein the data signal may be a plurality of samples provided at a sampling frequency and a processor configured to compute differences between pairs of the plurality of sample, compute a first order moment for the differences, compute a second order moment for the differences, derive a higher order moment for the differences using only the computed first order moment and the computed second order moment, estimate a higher order moment for the differences using only an average of the differences taken to a power corresponding to the higher order moment, subtract the derived higher order moment for the differences from the estimated higher order moment for the differences and determine wherein the device may be experiencing motion based at least in part on a comparison of the result of the subtraction to a threshold.

DETAILED DESCRIPTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

In the described embodiments, raw data refers to measurement outputs from the sensors which are not yet processed. Motion data refers to processed raw data. In many situations, operations known as sensor fusion may involve combining data obtained from multiple sensors to improve accuracy and usefulness of the sensor data, such as by refining orientation information or characterizing a bias that may be present in a given sensor. Thus, processing may include applying a sensor fusion algorithm or applying any other algorithm to provide enhanced data. In the described embodiments, a MPU may include processors, memory, control logic and sensors among structures.

As noted above, traditional motion detection systems can observe signals from sensors over a period of time and verify that the signals are within a sufficiently small range for a sufficient period of time, which may in turn be used to characterize a no motion condition for a sensor device. However, this determination that a no motion event has occurred can take a long time (e.g., eight seconds), making such motion detection systems inefficient.

Figure 1:
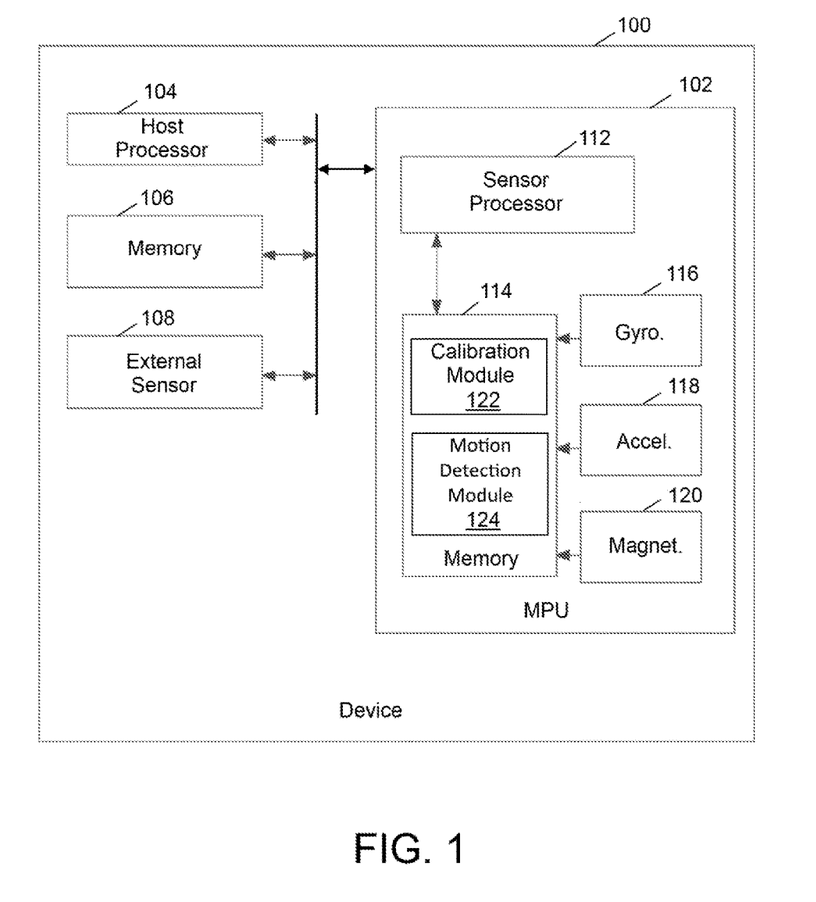
FIG. 1 is a schematic diagram of device configured to characterize motion according to an embodiment.

Details regarding one embodiment of a mobile electronic device 100 with a motion sensor and including features of this disclosure are depicted as high level schematic blocks in FIG. 1. As will be appreciated, device 100 may be implemented as a device or apparatus, such as a handheld device that can be moved in space by a user and its motion and/or orientation in space therefore sensed. For example, such a handheld device may be a mobile phone (e.g., cellular phone, a phone running on a local network, or any other telephone handset), wired telephone (e.g., a phone attached by a wire), personal digital assistant (PDA), video game player, video game controller, navigation device, mobile internet device (MID), personal navigation device (PND), digital still camera, digital video camera, binoculars, telephoto lens, portable music, video, or media player, remote control, or other handheld device, or a combination of one or more of these devices. It will also be appreciated that device 100 may also be implemented as a vehicle, such as a drone, or other device capable of motion or conveyance. Still further, device 100 may be an accessory, component, or otherwise be associated with such a vehicle.

In some embodiments, device 100 may be a self-contained device that includes its own display and other output devices in addition to input devices as described below. However, in other embodiments, device 100 may function in conjunction with another portable device or a non-portable device such as a desktop computer, electronic tabletop device, server computer, etc. which can communicate with the device 100, e.g., via network connections. The device may be capable of communicating via a wired connection using any type of wire-based communication protocol (e.g., serial transmissions, parallel transmissions, packet-based data communications), wireless connection (e.g., electromagnetic radiation, infrared radiation or other wireless technology), or a combination of one or more wired connections and one or more wireless connections.

As shown, device 100 includes MPU 102, host processor 104, host memory 106, and may include one or more sensors, such as external sensor 108. Host processor 104 may be configured to perform the various computations and operations involved with the general function of device 100. Host processor 104 may be coupled to MPU 102 through bus 110, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, or other equivalent. Host memory 106 may include programs, drivers or other data that utilize information provided by MPU 102. Exemplary details regarding suitable configurations of host processor 104 and MPU 102 may be found in co-pending, commonly owned U.S. patent application Ser. No. 12/106,921, filed Apr. 21, 2008, which is hereby incorporated by reference in its entirety.

In this embodiment, MPU 102 is shown to include sensor processor 112, memory 114 and internal sensors, represented in the embodiment by gyroscope 116, accelerometer 118 and magnetometer 120. The internal sensors may be implemented as a MEMS-based motion sensor, including inertial sensors such as a gyroscope or accelerometer, or an electromagnetic sensor such as a Hall effect or Lorentz field magnetometer. As desired, one or more of the internal sensors may be configured to provide raw data output measured along three orthogonal axes or any equivalent structure. Memory 114 may store algorithms, routines or other instructions for processing data output by one or more internal sensors, including calibration module 122 and motion detection module 124 as described in more detail below. If provided, external sensor 108 and/or an additional internal sensor may include one or more sensors, such as accelerometers, gyroscopes, magnetometers, pressure sensors, microphones, proximity, and ambient light sensors, and temperature sensors among others sensors. Notably, in embodiments featuring a temperature-based calibration operation, external sensor 108 may be a temperature sensor or another internal sensor may be employed. As used herein, an internal sensor refers to a sensor implemented using the MEMS techniques described above for integration with MPU 102 into a single chip. Similarly, an external sensor as used herein refers to a sensor carried on-board device 100 that is not integrated into MPU 102.

Even though embodiments are described in the context of internal sensors implemented in MPU 102, these techniques may be applied to a non-integrated sensor, such as external sensor 108 and likewise the calibration module may be implemented using instructions stored in any available memory resource, such as host memory 106, that may be executed using any available processor, such as host processor 104. Still further, the functionality performed by the calibration module may be implemented using any combination of hardware, firmware and software.

As will be appreciated, host processor 104 and/or sensor processor 112 may be one or more microprocessors, central processing units (CPUs), or other processors which run software programs for device 100 or for other applications related to the functionality of device 100. For example, different software application programs such as menu navigation software, games, camera function control, navigation software, and phone or a wide variety of other software and functional interfaces can be provided. In some embodiments, multiple different applications can be provided on a single device 100, and in some of those embodiments, multiple applications can run simultaneously on the device 100. Multiple layers of software can be provided on a computer readable medium such as electronic memory or other storage medium such as hard disk, optical disk, flash drive, etc., for use with host processor 104 and sensor processor 112. For example, an operating system layer can be provided for device 100 to control and manage system resources in real time, enable functions of application software and other layers, and interface application programs with other software and functions of device 100. In some embodiments, one or more motion algorithm layer may provide motion algorithms for lower-level processing of raw sensor data provided from internal or external sensors. Further, a sensor device driver layer may provide a software interface to the hardware sensors of device 100. Some or all of these layers can be provided in host memory 106 for access by host processor 104, in memory 114 for access by sensor processor 112, or in any other suitable architecture.

In some embodiments, it will be recognized that the exemplary architecture depicted in FIG. 1 may allow the calibration of one or more internal sensors to be performed using MPU 102 and may not require involvement of host processor 104 and/or host memory 106. Such an embodiment may be termed a self-calibrating MPU and, as described above, may be implemented with internal sensor or sensors 116 on a single substrate. Moreover, as will be described below, the calibration techniques may be implemented using computationally efficient algorithms to reduce processing overhead and power consumption. Correspondingly, some embodiments may implement the functions of calibration module 122 and/or motion detection module 124 in hardware. In other embodiments, either or both modules may be implemented using any suitable combination of hardware, software and/or firmware.

One suitable implementation of this disclosure's techniques may include calibration of a gyroscope, such as gyroscope 116. Upon determination of a no motion event by executing the instructions associated with motion detection module 124, a gyroscope bias may be calculated for applying to the gyroscope signal, for example by calibration module 122. The gyroscope bias also can be utilized, for example, for temperature compensation. The processor of the device 100 can also determine that the data is due to a no motion event and record a gyroscope bias that can be utilized, for example, for temperature compensation. Additionally, according to another non-limiting example, a gyroscope bias can have a correlation to temperature. When determining the gyroscope bias, the bias and temperature can be saved and sent to a temperature compensation algorithm. Over time, for example, the temperature compensation algorithm can learn the relationship between the gyroscope bias and temperature, which may be measure using external sensor 108 or a different sensor as noted above. This compensation can then be applied to reduce the overall gyroscope error as temperature changes in the future.

Figure 2:
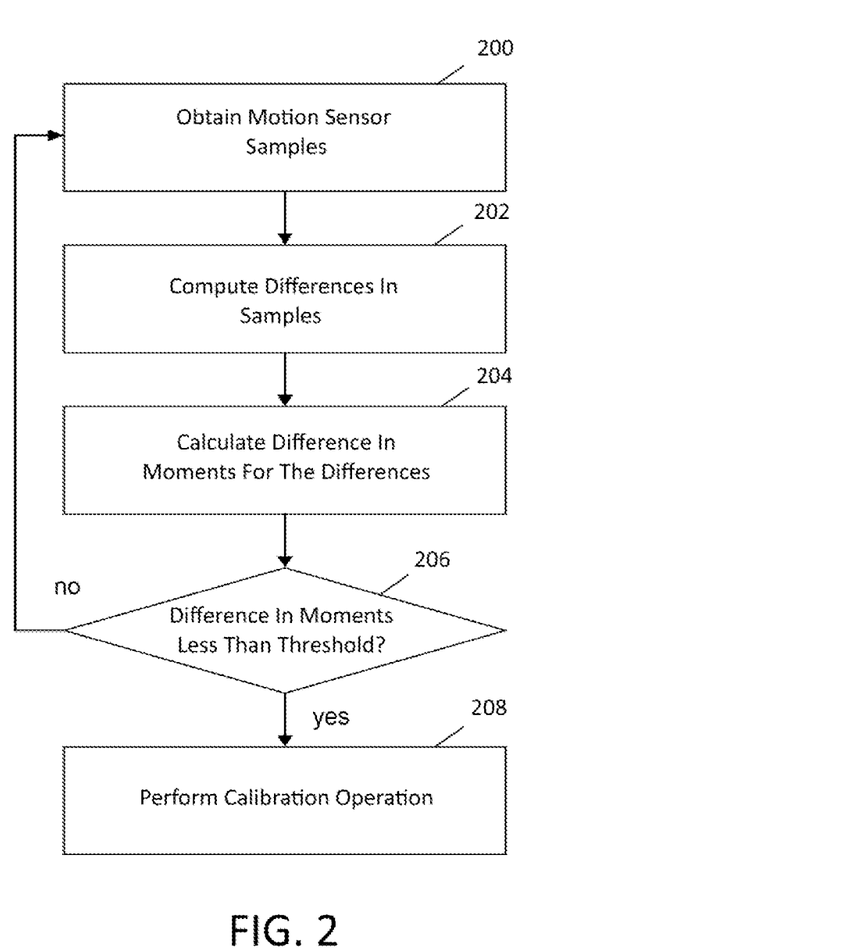
FIG. 2 is a flow chart showing a calibration operation following a no motion event detection according to an embodiment.

To help illustrate, one suitable routine for characterizing motion is schematically depicted as the flow chart shown in FIG. 2. Beginning with 200, motion sensor data that reflects movement of device 100 may be obtained. The data signal may be a plurality of samples provided at a sampling frequency. Pairs of the samples may be selected in 202 and the differences in each pair computed. In 204, a calculation may be performed that corresponds to subtracting an expected higher order moment for the differences from an observed higher order moment for the differences to obtain a difference of the moments. As discussed below, the expected higher order moment may be derived from an observed first order moment for the differences and an observed second order moment for the differences. Next, in 206, it may be determined whether device 200 is experiencing motion based at least in part on a comparison of the difference of the moments to a threshold. In some embodiments, a no motion event detection causes the routine to progress to 208 and a calibration operation may be performed. Otherwise, the routine returns to 200 for analysis of another portion of the data signal stream.

Thus, gyroscope bias may be computed upon determination that device 100 is not moving based at least in part on the average of the gyroscope sensor data in this motion condition. Since the standard deviation of a gyroscope signal may be relatively small, such as on the order of one to two bits, the number of signal samples needed to provide an accurate estimate of the bias is also relatively small. As such, a significant portion of the time consumed by gyroscope calibration may be attributed to the length of time needed to determine if the gyroscope is moving or not. The techniques of this disclosure involve determining a no motion event by observing the data for a period of time and confirming it is within a particular range. Significant reductions in the needed time may be achieved by assuming motion of device 100 caused by a user will produce a sensor signal that is non-Gaussian. Further information regarding the calculation of moments of a motion sensor signal and the comparison of those moments to determine whether the signal is Gaussian may be found in commonly-assigned U.S. Pat. No. 8,843, 345, issued Sep. 23, 2014 and entitled "Motion Determination," which is hereby incorporated by reference in its entirety.

As will be appreciated, a Gaussian process has well defined moments. The moment generating function for a Gaussian process, with mean=$\mu$ and variance=$\sigma^2$ is given in Equation (1) as follows:

$$M(t) = e^{\mu \cdot t + \frac{\sigma^2 \cdot t^2}{2}} \tag{1}$$

Correspondingly, the N'th moment equation about the origin may be obtained by determining the N'th derivative of M(t) and setting t to zero. The first 4 Gaussian moments are given below, as Equations (2)-(5):

$$M_1 = \mu \tag{2}$$

$$M_2 = \mu^2 + \sigma^2 \tag{3}$$

$$M_3 = \mu^3 + 3 \cdot \mu \cdot \sigma^2 \tag{4}$$

$$M_4 = \mu^4 + 6 \cdot \mu^2 \cdot \sigma^2 + 3 \cdot \sigma^4 \tag{5}$$

As indicated by these examples, $3^{rd}$ order and higher moments of a Gaussian process may be computed from the $1^{st}$ and $2^{nd}$ order moments. All moments of a Gaussian process are functions of $\mu$ and $\sigma$. Knowing the $1^4$ and $2^{nd}$ order moments allows one to compute $\mu$ and $\sigma$ and in turn calculate all higher order moments. The techniques of this disclosure involve comparing an observed higher order moment taken from the sensor measurements to an expected moment determined by an appropriate combination of the observed $1^{st}$ and $2^{nd}$ order moments. In this context, the term "higher order" refers to a $3^{rd}$ order moment or higher. When a motion sensor is not moving, then the observed measurements are approximately Gaussian as the sensor is measuring noise. Accordingly, if the two values are within a suitable threshold, it may be assumed that the signal is Gaussian, indicating a no motion event. Correspondingly, based on this comparison, a calibration of at least a parameter of the sensor may be performed. For example, for sensor data from a gyroscope, the mean vale of the signal during the no motion event may be taken as the gyroscope bias (offset). Embodiments discussed in the following materials are in the context of the 4th order moment, but the techniques may be extended to other higher order moments as well, such as 3rd, $5^{th}$ or others. As an example, the higher order moment may be even. Further, these techniques are described in conjunction with calibrating a gyroscope, but may be extended to any type of sensor that also produces a Gaussian process, including magnetometers and accelerometers, such as accelerometer 118 and/or magnetometer 120. For processes that don't have Gaussian White Noise, then the expected moment function could be pre-computed based off the expected noise type or a whitening filter could be applied to make the noise white and therefore Gaussian before using these techniques.

As an illustration of one embodiment of this disclosure, it will be appreciated that for a given series of sensor samples, $x_0, x_1, \ldots, x_{N-1}$, the observed $i^{th}$ orders, the Expected values using the Expected value function E( ), also represented with $T_i$, herein, are given by Equations (6)-(9):

$$T_1 = E(\bar{x}) = \frac{1}{N}\sum_{n=0}^{N-1}(x_n)^1 \tag{6}$$

$$T_2 = E(\bar{x}^2) = \frac{1}{N}\sum_{n=0}^{N-1}(x_n)^2 \tag{7}$$

$$T_3 = E(\bar{x}^3) = \frac{1}{N}\sum_{n=0}^{N-1}(x_n)^3 \tag{8}$$

$$T_4 = E(\bar{x}^4) = \frac{1}{N}\sum_{n=0}^{N-1}(x_n)^4 \tag{9}$$

Correspondingly, the difference in the observed $4^{th}$ order moment and the expected $4^{th}$ order moment may be represented by subtracting Equation (5) from Equation (9) while using Equations (6) and (7) to solve for $\mu$ and $\sigma$ as indicated by Equation (10):

$$M_d = E(\bar{x}^4) - M_4 = T_4 - 3*T_2^2 + 2*T_1^4 \tag{10}$$

One characteristic of Equation (10) is that the confidence or distribution will be large when the mean is large. To avoid this result, an analog of Equation (10) may be derived by rewriting Equations (5) and (9) with the mean removed, which are shown as Equations (11) and (12), respectively:

$$M_4 = 3*T_2^2 - 6*T_2*T_1^2 + 3*T_1^4 \quad (11)$$

$$E((\bar{x}-\mu)^4) = T_4 - 4*T_3* + 6*T_2*T_1^2 - 3*T_1^4 \quad (12)$$

Accordingly, the difference in moments may be obtained by subtracting Equation (11) from Equation (12), which results in Equation (13):

$$V_4 = E((\bar{x}-\mu)^4) - M_4 = T_4 - 4*T_3* + 6*T_2*T_1^2 - 3*T_1^4$$

$$- (3*T_2^2 - 6*T_2*T_1^2 + 3*T_1^4) \quad (13)$$

Simplification of Equation (13) gives Equation (14):

$$V_4 = T_4 - 4*T_3* - 3*T_2^2 + 12*T_2*T_1^2 - 6*T_1^4 \quad (14)$$

An equivalent set of calculations may be made with respect to the $3^{rd}$ order moment to generate Equation (15):

$$V_3 = E((\bar{x}-\mu)^3) - M_3 = T_3 - 3*T_2*T_1 + 2*T_1^3 \quad (15)$$

Substituting the $3^{rd}$ order moment represented by Equation (15) into Equation (14) results in Equation (16):

$$V_4 = T_4 - 3*T_2^2 + 2*T_1^4 - 4*V_3*T_1 \quad (16)$$

Since $V_4$ represents the difference between the observed higher order moment and the expected moment calculated from the $1^{st}$ and $2^{nd}$ order moments, when $|V_4| < T_D$ it may be assumed that the samples obtained from the sensor exhibit a Gaussian distribution and therefore were measured during a no motion event, where $T_D$ is a suitable threshold. Correspondingly, the mean of these samples may be taken as an estimate of the gyroscope bias under the techniques of this disclosure. When selecting $T_D$, it may be noted that a false negative may be relatively less detrimental, depending on the particular application. For example, when detecting a no motion event for calibrating a gyroscope, if there is a period when device 100 is in fact motionless, but is producing a gyroscope signal that does not meet the threshold for declaring the signal Gaussian, the result is only that an opportunity for calibration has been missed and updating the bias may be delayed somewhat. This may provide improved performance as compared to the counter option, i.e., determining a gyroscope bias when device 100 was actually moving, which would result in an incorrect bias determination.

In one aspect, the above equations may be applied to differences between samples in order to determine whether the signal is Gaussian or not, rather than the samples themselves. For example, given a series of sensor samples $g_0, g_1, \ldots, g_{N-1}$, $x_n$ in the above equations may be set to $g_n - g_{n-m}$, wherein m is at least one to establish the number of samples between the samples being used to obtain the difference. Importantly, by taking the difference between two samples, regardless of whether they are consecutive, the mean cancels out. Essentially, taking the difference between two samples corresponds to subtracting a Gaussian process from a Gaussian process (when there is a no motion event), producing another Gaussian process. Although more noise may be present and the standard deviation may increase by taking the difference between samples, a significant reduction in computational difficulty may be achieved. Based on the observed standard deviation and the available computational resources, the difference method as explained here may be applied, or the standard method of using the sensor sample as explained above may be applied. Specifically, taking the difference between samples allows Equation (16) to be simplified as Equation (17):

$$V_4 = T_4 - 3*T_2^2 \quad (17)$$

As will be appreciated, Equation (17) requires only calculation of $T_2$ and $T_4$ according to Equations (7) and (9). Given the reduced computational requirements, determination of Equation (17) may readily be implemented using hardware in some embodiments to reduce power requirements and increase efficiency as desired.

As noted above, the value of m establishes the spacing between samples used to obtain the difference. In some embodiments, it may be desired to select a value for m that improves the discrimination between motion and no motion. Particularly, when device 100 is undergoing motion, there may be one or more frequencies associated with the type of motion being experienced. For example, when device 100 is being held in a user's hand, a motion corresponding to jitter may be observed at approximately 7 Hz. In one embodiment, a suitable value of m corresponds to a spacing between samples that is in opposite phase with the frequency where motion is expected, such as at 180 degrees. In the context of rejecting the frequency associated with hand jitter, this corresponds to $0.5*(1/7)$ seconds or a 71.4 ms spacing between samples. At an exemplary sampling frequency of 200 Hz, 71.4 ms constitutes a spacing of approximately 14 samples, so that m may be set to 14 to achieve the desired sensitivity of detecting motion at 7 Hz. More accurately, 14 samples at the rate of 200 Hz is 70 ms, meaning the actual peak frequency rejected is $0.070 = 0.5/f$, or $f = 7.1429$ Hz. It has been demonstrated that at this sample rate, setting m to a value of 14 achieves more accurate detection of no motion events than a value of 1. Tailoring m to a target frequency may also reduce the computational requirements associated with calculating Equation (17) as compared to other formulations of the moment difference, such as Equation (16). For example, at a sample rate of 200 Hz, the calculations associated with rejecting a 10 Hz tone are significantly reduced when m is 14 as compared to when m is 1 for Equation (17).

More generally, choosing an appropriate value for m may depend, at least in part, on relating the delay between the samples to a frequency corresponding to the type of motion that may be expected given the use case of device 100 as indicated by Equation (18):

$$\text{time\_delay\_s} = \frac{0.5}{\text{frequency\_to\_discriminate\_in\_Hz}} \quad (18)$$

Figure 3:
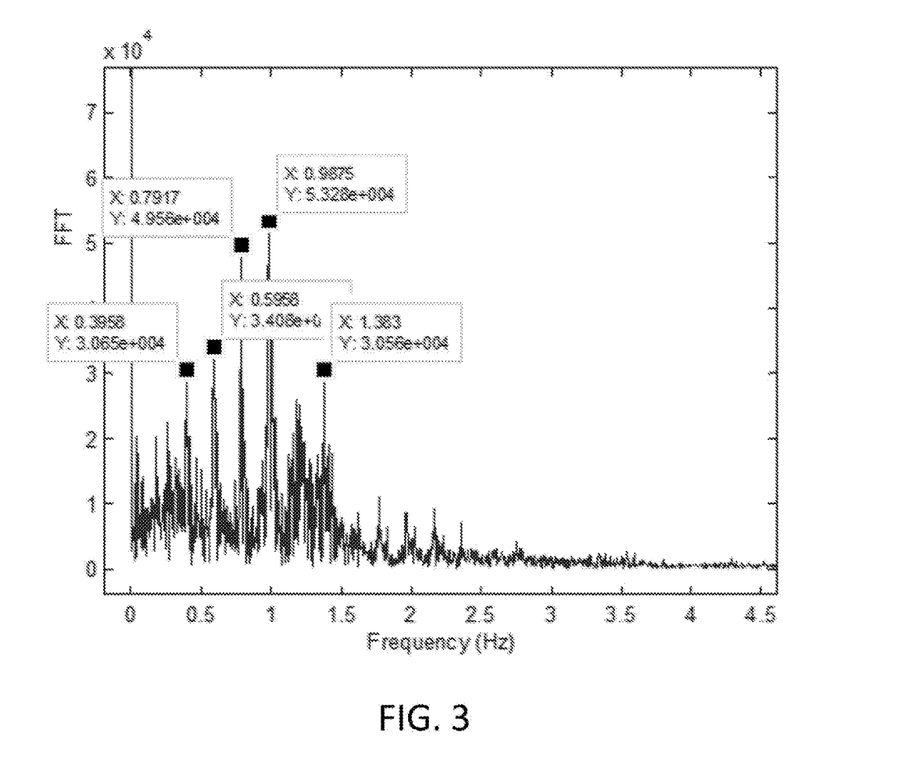
FIG. 3 is a schematic representation of expected frequencies of motion associated with a head mounted device according to an embodiment.

In the above embodiment, it was noted that hand jitter often exhibits a characteristic frequency of approximately 7 Hz, and as such, it may be desirable to employ a value of 14 form when device 100 is a smartphone or other hand held device. Corresponding determinations of suitable values of m may be made for other use cases that have motion at an expected frequency or a bandwidth that encompasses a range of expected frequencies. As an illustration only, and without limitation, device 100 may be configured as a head mounted display, which may exhibit motion at relatively low frequencies, with notable peaks in the range of 0.3958 to 1.383 Hz as indicated by FIG. 3, in which a Fast Fourier Transform (FFT) shows the frequencies that may be associated with repetitive motions caused by breathing or other physiological processes. Yet another example relates to applications in which device 100 is a drone or is configured for use with a drone or other motorized vehicle. In such use cases, it may be desirable to select a value of m that is tuned to an operating frequency of the motor or engine associated with the vehicle. Since the appropriate delay for a given frequency may not correspond to an even number of samples at the sample rate being employed, a suitable approximation may be made by applying Equation (19):

$$\text{samples\_to\_skip} = \text{round}(\text{sample\_rate\_in\_Hz} * \text{time\_delay\_s}) \quad (19)$$

Although the above discussion has been in the context of setting m to a constant value, in other implementations the value may be varied. In one aspect, this may allow the use of a plurality of values for m, each of which may correspond to a specific frequency to achieve a stronger rejection for a range of samples or may make implementation easier as noted below. Selection of appropriate values for m may be made to cause Equation (17) to have increased sensitivity to the range of frequencies indicated by Equations (18) and (19), so that motion detection may be improved over a bandwidth corresponding to the range of frequencies.

The techniques of this disclosure may be applied to detect no motion events at a wide variety of sampling rates. In some embodiments, implementation may be facilitated by effectively capping the sample rate to allow sufficient time to perform the associated calculations. For example, if the sample rate for a given sensor exceeds a threshold, the signal could be decimated by an appropriate amount. The threshold may depend on factors such as the availability of computational resources. As an illustration, decimation may involve dropping samples as necessary to achieve the desired sample rate, such as dropping every 4 intervening samples from a sensor and utilizing every $5^{th}$ sample operating at 1000 Hz to achieve an effective sample rate of 200 Hz.

The embodiments described above have related to the detection of no motion events. However, the techniques may also be applied to characterize other types of motion events. Notably, if the difference in moments exceeds a threshold, which in some embodiments may be higher than $T_D$, it may be determined that the sensor signal is not Gaussian, which in turn may be taken as an indication of purposeful movement. Accordingly, it may be determined whether the sensor was being worn and/or held as opposed to not worn and/or held on the body. A suitable threshold may also be used to determine activity, such as moving or not moving or to determine if there is a small amount of motion. As another example, analyzing the difference of moments may help validate or test sensor function. In one embodiment, determining the result of the subtraction is within a threshold may be used to confirm correct operation of the sensor when it is known the device is not moving. Further, a small amount of motion could be used as a gate to perform an algorithm that computes an acceleration bias. The samples could be acceleration data, gyro data, or linear acceleration data in this particular example. Further details regarding may be found in co-pending, commonly-assigned U.S. Patent Publication No. 2013/0197845, filed Oct. 12, 2012 and entitled "In-Use Automatic Calibration Methodology For Sensors In Mobile Devices," which is incorporated in its entirety by reference.

As desired, the techniques of this disclosure may also include a normalization aspect. For example, to save in computation, N, in equations (6), (7), (8) and (9) could be a power of 2, allowing the bits in the summation result to be shifted instead of divided. Furthermore, equations (16) and/or (17) may be normalized by a power of the number of samples, so that computation of $V_4$ when scaled by a power of the number of samples, N, reduces the computational overhead. In equation (17) if both sides of the equation are multiplied by $N^2$, no division is needed. Furthermore, a combination of scaling and a power of 2 can be done to ensure the range of values fit within the bit widths of the computation unit.

The above discussion notes that the techniques of this disclosure allow for calculations that may be readily implemented in hardware. Further modifications may result in additional savings in computational resources. For example, performing the operations associated with setting $x_n$ to $g_n - g_{n-m}$ implies storing the series of sensor samples $g_0$, $g_1$, ..., $g_{N-1}$, which imposes a memory requirement. As will be appreciated, an alternative result may be obtained by applying the following logic:

Current Sample = $g_n$
count = count + 1
If count > threshold_1
    Previous_Previous_Sample = Previous_Sample
    Previous_Sample = Current_Sample
    count = 0
Endif
$x_n$ = Current_Sample - Previous_Previous_Sample By setting threshold_1 to an appropriate value, a delay approximating 71.4 ms for highlighting motion detection at a range of frequencies near 7 Hz may be achieved or other delays may be established according to the relationships shown in Equations (18) and (19). Similarly, changing threshold_1 may allow for emphasis across a range of frequencies as described above. A savings in memory requirements may also be obtained for embodiments in which m is 1, such as by applying the following logic:

$$x_n = g_n - \text{Previous\_Sample}$$

$$\text{Previous\_Sample} = g_n$$

The above discussion includes embodiments that involve difference of moments for the $4^{th}$ order. It has been determined that in some applications these comparisons provide more accurate motion characterization than a corresponding calculation using the $3^{rd}$ order moment difference. However, in other embodiments, the $3^{rd}$ order moments or other higher order moments may be used. Further, it has been determined that gyroscope measurements may result in more accurate motion characterization than accelerometer measurements, for example. However, it may still be desirable to apply these techniques to an accelerometer signal. For example, an initial no motion detection may be performed using an appropriate sensor, such as accelerometer 118 or magnetometer 120, followed by a confirming calculation using the gyroscope 116 to help mitigate the relatively high power consumption associated with operating the gyroscope. The thresholds may be different for both cases, where the first no motion determination may have a threshold setting allowing for a lower confidence. As will be appreciated, this allows the gyroscope to be maintained in a reduced power mode until analysis of the accelerometer and/or magnetometer signal indicates the existence of a potential no motion event.

Independently, the use of a different type of sensor to also make a motion detection may help avoid false positives by corroborating the determination made using the gyroscope signal. Then, gyroscope 116 may be activated and the no motion detection confirmed using the gyroscope signal before calibrating the gyroscope by taking the mean of the signal as the gyroscope bias. Alternatively, if confidence in the no motion detection using the other sensor(s) is sufficient, the gyroscope may be calibrated directly with first confirming the no motion event detection. Further, it may be desirable to perform motion detection for all axes of a sensor, with the requirement that $|V_4|$ be below the appropriate threshold for all axes to reach a no motion determination.

To further reduce the probability of a false no motion event and to also fix the maximum number of bits needed in the math for equations done after taking the difference of sensor samples, some embodiments of this disclosure may benefit from making an initial motion detection using the difference of the sensor samples, such as the difference, $g_n - g_{n-m}$. Given that a sensor may have an expected maximum noise according to its specifications, a difference between two samples that exceeds the maximum noise may preclude the need to calculate the difference in moments as this may unambiguously indicate device 100 is undergoing motion. For example, a first threshold T may be used to evaluate the absolute value difference between two sensor samples. Since the difference may be determined for samples that are spaced apart, if $x_n$ has been set to $g_n - g_{n-m}$, as discussed above, this value may be used. This evaluation is represented by Equation (20):

$$|x_n| < T, \text{ for } n=0 \text{ to } N-1 \quad (20)$$

Since the sensor signal may be expected to be Gaussian when no motion is occurring, it may have a standard deviation, $\sigma$, and a mean $\mu$. Correspondingly, the distribution of a difference between samples will still be Gaussian with a standard deviation of $\sigma\sqrt{2}$ and mean 0. The threshold T may be expressed in terms of standard deviations of the noise. Further, the cumulative distribution function (CDF) of a Gaussian number with standard deviation, $\sigma$, and mean $\mu$, expressed using Matlab functions, may be written as Equation (21):

$$CDF = .5\left(1 + \text{erf}\left(\frac{x-\mu}{\sigma\sqrt{2}}\right)\right) \quad (21)$$

An appropriate threshold T will make Equation (20) true with a with probability of P when N is 1, resulting in Equation (22), also expressed with Matlab functions:

$$1 - \frac{1-P}{2} = .5\left(1 + \text{erf}\left(\frac{T}{2\sigma}\right)\right) \quad (22)$$

This may be rewritten as Equation (23):

$$\text{erf}\left(\frac{T}{2\sigma}\right) = P \quad (23)$$

Applying the Matlab inverse function to Equation (23) results in Equation (24):

$$T = \text{erfinv}(P) * 2\sigma \quad (24)$$

The above equations illustrate determination of the threshold T for N=1, and may be extended to accommodate all Ns with a probability of Q as indicated by Equation (25):

$$T = \text{erf}inv\left(Q^{\frac{1}{N}}\right) * 2\sigma \quad (25)$$

In some embodiments, a suitable value of Q is 0.9 and a may be set to the maximum value established by the specifications of the sensor being used. In summary, Equation (25) tells how to set a threshold for a probability that N difference samples are below a threshold.

In a further aspect, the number of samples N used when characterizing motion of device 100 may be adjusted to achieve a desired degree of performance, using any combination of statistical and empirical approaches. In one embodiment, a statistical determination of N may be compared to an empirical determination of N and the larger may be used to increase confidence in the motion characterization.

For example, a statistical evaluation may be performed with regard to the degree of accuracy being sought when calculating the sensor bias. The may taken as corresponding to the confidence of the mean, which is shown in Equation (26) for a 95% confidence interval:

$$\text{bias error} = \frac{1.96 * \sigma}{\sqrt{N}} \quad (26)$$

One suitable degree of accuracy may be to obtain a bias that is within ½ of a least significant bit of the sensor signal. In an embodiment having a 16-bit signal at 2000 dps, a 95% accuracy may be achieved by applying Equation (27), in which a is expressed in dps:

$$N = \left(\frac{1.96 * \sigma}{\left(\frac{2000}{2^{16}}\right)}\right)^2 \quad (27)$$

As will be appreciated, if the number of samples indicated by Equation (27) exceeds a practical amount, a balance in performance may be struck by reducing the number of samples at the expense of some accuracy.

Figure 4:
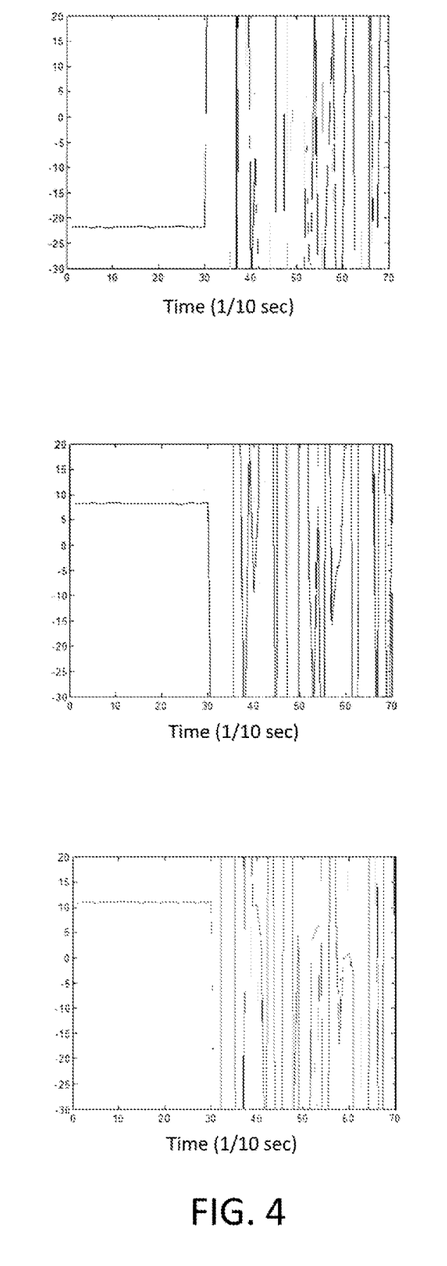
FIG. 4 is a schematic representation of a gyroscope signal, with the top view, middle view and bottom vies showing each axis independently, for a head mounted display during a no motion event followed by a motion event according to an embodiment.
Figure 5:
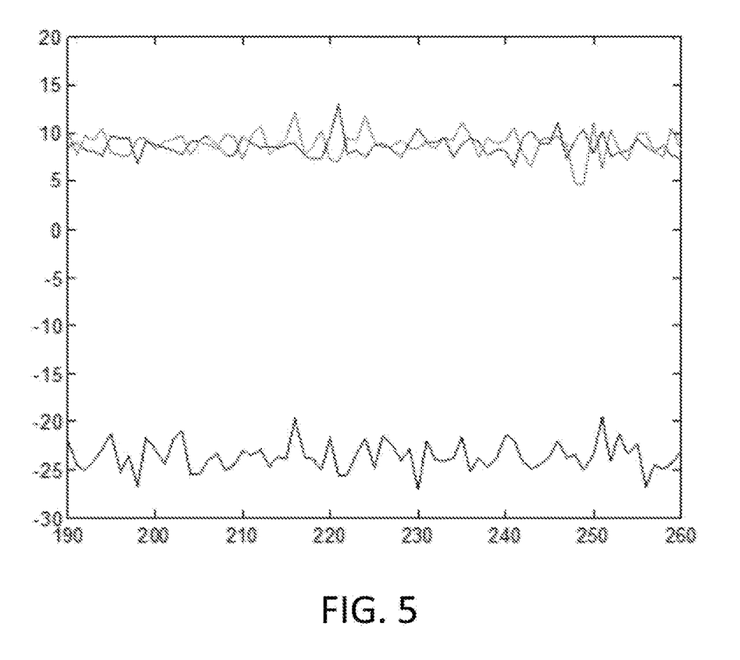
FIG. 5 is a schematic representation of each axis of a gyroscope signal for a head mounted display when worn according to an embodiment.
Figure 6:
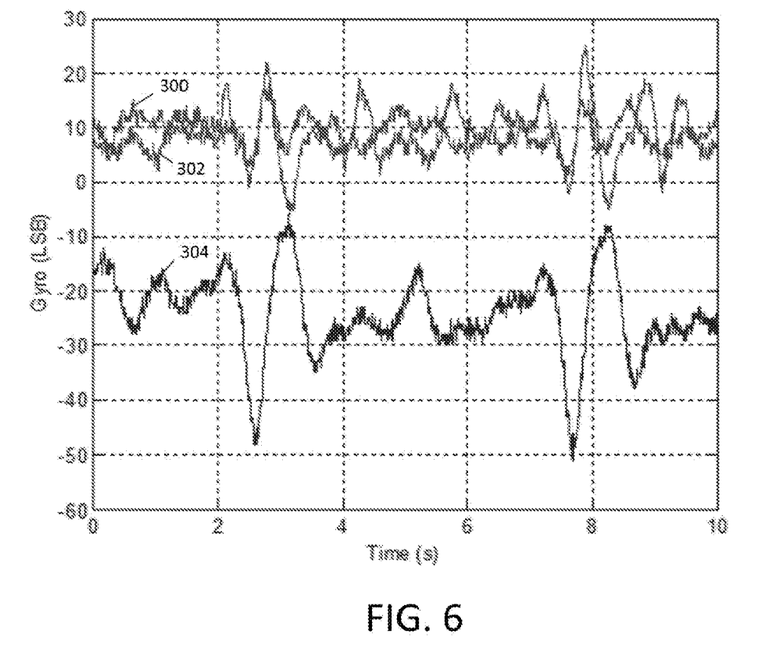
FIG. 6 is a schematic representation of each axis of a gyroscope signal for a head mounted display showing expected frequencies of movement according to an embodiment.

Furthermore, an empirical determination of the number of samples to employ may be achieved through an appropriate process of experimentation, such as by determining over what period of time the moment differences may be calculated to make the motion characterization. For a hand held use case, such as when device 100 is a smartphone, it has been determined that approximately ½ second of samples may be sufficient. In other use cases, different time intervals may be employed to determine the number of samples to be used. Exemplary data for a head mounted use case, such as for a Head Mounted Display (HMD), is depicted in FIG. 4. As indicated, the gyroscope signal (each axis shown independently) exhibits a relatively flat, Gaussian distribution for the first three seconds when the device is on a lying on a surface, succeeded by a non-Gaussian signal, corresponding to motion of the device. When the user is wearing the HMD, even when the user is not moving his head, the gyroscope signal is less flat, as in shown in FIG. 5. Further, FIG. 6 is a graphical representation of the gyroscopes signal for a head mounted use case (HMD) over a period of ten seconds, with the x-axis shown as trace 300, the y-axis as trace 302 and the z-axis as trace 304. Although the user was not moving, the gyroscope signal still demonstrates that movement exists at the low frequencies indicated by FIG. 3. Some of the peaks of the gyroscope signal may, for example, be due to the breathing action of the user (at about 0.5 Hz). Accordingly, in one embodiment, an interval in the range of approximately 2 to 3 seconds, or even longer, may be used for head mounted use cases. An additional correction for e.g.

the breathing motion may also be performed. These examples show that based on the use case and the dominant motion frequency, N may be determined empirically through experimentation, and then compared to the statically determined value of N. In aspects of the invention where device 100 is designed for a specific application, the value of N, as well as other aspect of the invention, may be predetermined and adapted to the characteristics of the motion of the application. For example, if device 100 is associated with a drone, N may be adapted to the motion characteristics of the rotor vibrations. In aspects of the invention where the device is used in various applications, which each may have different motion characteristics, the value of N, as well as other aspect of the invention, may be adaptive and may be set depending on the detected context of device 100.

Figure 7:
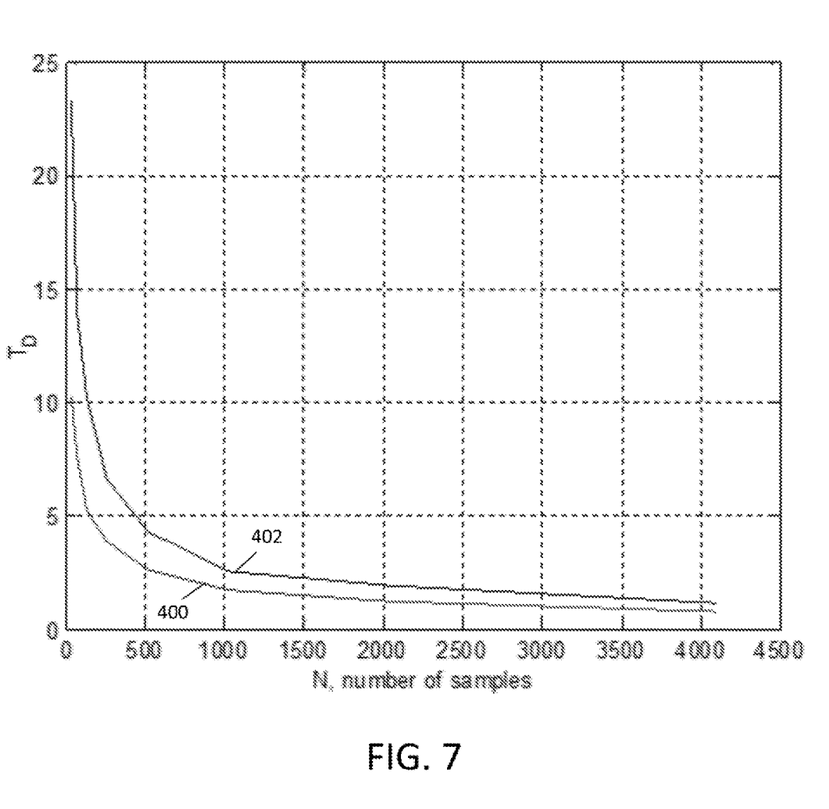
FIG. 7 is a schematic representation showing the relationship between the threshold for the difference of moments and the number of samples according to an embodiment.

In some embodiments, it may be desirable to select an appropriate moment difference threshold, when evaluating $|V_4|<T_D$ to characterize motion of device 100. One factor that may influence this selection is that the sensor signal when not moving may not be purely Gaussian, but rather is an approximation of Gaussian noise. To help illustrate the effect of how the threshold changes versus the number of samples when performing the calculations associated with Equation (17), FIG. 7 is a graphical representation of the relationship between $T_D$ and the number of samples being employed to achieve a confidence of 99% as shown by trace 400 or to achieve a confidence of 99.9% as shown by trace 402, each at one standard deviation σ. As may be seen at either confidence level, $T_D$ approaches zero as the number of samples increase. Although these results are applicable when applying Equation (17), a similar relationship exists when applying Equation (16), with the distinction that the threshold may be approximately 4 times smaller. In general, the $T_D$ differs by this because the standard deviation differs by the factor $\sqrt{2}$, so raising that to the $4^{th}$ power is 4. Thus, the curve scales by a factor of the standard deviation to the $4^{th}$ power, as may be expected given that the input data is summed over the $4^{th}$ power. These relationships may be used to estimate how to adjust thresholds when warranted.

Figure 8:
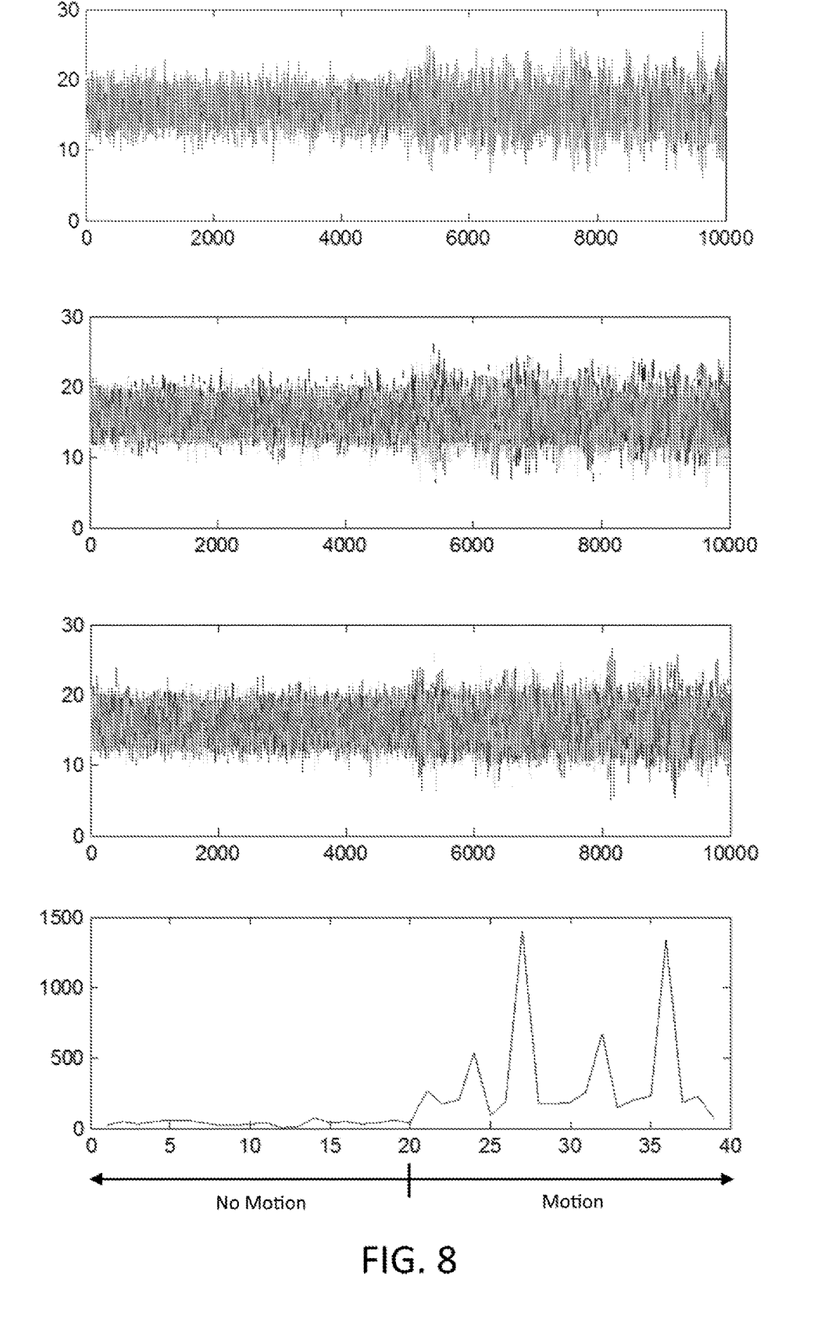
FIG. 8 graphically depicts each axis of a gyroscope signal in the top three views and the resulting difference of moments in the bottom view for a period of no motion and a period of motion according to an embodiment.

To illustrate the results of the techniques of this disclosure, FIG. 8 graphically depicts each axis of a gyroscope signal and the resulting difference of moments for a period of no motion and a period of motion. The top three graphs show simulated X,Y,Z gyroscope data for a first period during which the sensor was not moved and for a second period when the sensor was subjected to an extremely slight simulated hand jitter. In comparing the raw sensor data shown in these three graphs, the visible difference between these periods is relatively hard to distinguish. However, the bottom graph, corresponding to the same time scale as the top three graphs, shows the output of the difference of moments calculations described above. During the first period, the difference in moments is clearly reduced, indicating the Gaussian characteristics of the sensor signal during this no motion period. Conversely, the difference in moments is greater during the second period when the sensor was experiencing jitter. Thus, the techniques of this disclosure may be employed when detecting whether a sensor is undergoing motion.

Although the present invention has been described in accordance with the embodiments shown, one of ordinary skill in the art will readily recognize that there could be variations to the embodiments and those variations would be within the spirit and scope of the present invention. For example, many of the embodiments have concerned detecting a no motion event in order to coordinate calibration of a sensor, such as gyroscope 116. However, a determination that device 100 is undergoing motion may also be useful, such as for activity tracking or identification as described above. Further, motion characterization of device 100 using the techniques of this disclosure may be employed for any suitable purpose. As one example, and without limitation, determination of a no motion event lasting for a sufficient length of time may be taken as an indication that the user has stopped operating the device and has put is down on a surface. This may be used as a trigger to help control operation of device 100, such as by powering down one or more functions to conserve energy. It will be appreciated that many other behaviors of the device may be influenced by characterization of the motion it is undergoing. Accordingly, many modifications may be made by one of ordinary skill in the art without departing from the spirit and scope of the present invention.

What is claimed is:

1. A method for characterizing a motion of a device, comprising: obtaining a data signal from a motion sensor of the device, wherein the data signal comprises a plurality of samples provided at a sampling frequency; computing differences between pairs of the plurality of samples; performing a calculation corresponding to subtracting an expected higher order moment for the differences from an observed higher order moment for the differences to obtain a difference of the moments, wherein the expected higher order moment is based at least in part on an observed first order moment for the differences and an observed second order moment for the differences; and determining whether the device is experiencing motion based at least in part on a comparison of the difference of the moments to a threshold.

2. The method of claim 1, wherein the higher order moment is a fourth order moment for the differences.

3. The method of claim 2, wherein the difference of the moments is equal to the observed fourth order moment for the differences minus three times the observed second order moment for the differences squared.

4. The method of claim 1, wherein the higher order moment for the differences is an even order moment greater than a fourth order moment for the differences.

5. The method of claim 1, wherein the samples of each pair are spaced a fixed number of samples apart.

6. The method of claim 5, wherein the spacing is based at least in part on an expected frequency of motion of the device.

7. The method of claim 6, wherein the spacing is configured to oppose the phase of the expected frequency of motion of the device.

8. The method of claim 6, wherein the fixed number of samples is based at least in part on a reciprocal of the expected frequency of motion multiplied by the sampling frequency divided by two.

9. The method of claim 6, wherein the expected frequency of motion is approximately 7 Hz.

10. The method of claim 6, wherein the expected frequency of motion is based at least in part on a use case for the device.

11. The method of claim 10, wherein the use case for the device is determined based at least in part on a data signal from the motion sensor.

12. The method of claim 1, wherein the samples of each pair are spaced a varying number of samples apart.

13. The method of claim 12, wherein the varying number of samples corresponds to a bandwidth associated with expected frequencies of motion.

14. The method of claim 1, further comprising making an initial no motion determination by comparing a difference between two samples to a threshold.

15. The method of claim 1, wherein the threshold is based at least in part on a standard deviation of the motion sensor.

16. The method of claim 1, further comprising making an initial no motion determination based on an output of a different motion sensor.

17. The method of claim 1, further comprising determining the motion sensor is working properly when the result of the subtraction is within the threshold and it is known the device is not moving.

18. The method of claim 1, further comprising calculating an accelerometer bias when the result of the subtraction exceeds a threshold.

19. The method of claim 1, further comprising characterizing a behavior of a user of the device based at least in part on the determination of whether the device is experiencing motion.

20. The method of claim 1, wherein the motion sensor is a gyroscope.

21. The method of claim 20, further comprising calibrating at least a parameter of the gyroscope.

22. The method of claim 21, further comprising determining a gyroscope bias when the result of the subtraction is within the threshold.

23. The method of claim 20, further comprising setting a gyroscope temperature compensation learning term when the result of the subtraction is within the threshold.

24. The method of claim 1, wherein the motion sensor is an accelerometer.

25. The method of claim 1, wherein the motion sensor is a magnetometer.

26. A sensor device comprising; at least one motion sensor outputting a data signal, wherein the data signal comprises a plurality of samples provided at a sampling frequency; and a motion detection module configured to: compute differences between pairs of the plurality of samples; perform a calculation corresponding to subtracting an expected higher order moment for the differences from an observed higher order moment for the differences to obtain a difference of the moments, wherein the expected higher order moment is based at least in part on an observed first order moment for the differences and an observed second order moment for the differences; and determine whether the device is experiencing motion based at least in part on a comparison of the difference of the moments to a threshold.

27. The sensor device of claim 26, wherein the motion sensor is a gyroscope.

28. The sensor device of claim 27, further comprising a calibration module configured to determine at least a parameter of the gyroscope.

29. The sensor device of claim 28, further comprising determining a gyroscope bias when the result of the subtraction is within the threshold.

30. The sensor device of claim 28, wherein the device further comprises an additional motion sensor and wherein the motion detection module is further configured to make an initial motion detection before performing the calculation.

31. The sensor device of claim 26, wherein the at least one motion sensor and the motion detection module are implemented on a single substrate.

32. An integrated sensor processing unit characterizing a motion of a device, comprising: at least one motion sensor outputting a data signal, wherein the data signal comprises a plurality of samples provided at a sampling frequency; and a processor configured to: compute differences between pairs of the plurality of samples; compute a first order moment for the differences; compute a second order moment for the differences; derive a higher order moment for the differences using only the computed first order moment and the computed second order moment; estimate a higher order moment for the differences using only an average of the differences taken to a power corresponding to the higher order moment; subtract the derived higher order moment for the differences from the estimated higher order moment for the differences; and determine wherein the device is experiencing motion based at least in part on a comparison of the result of the subtraction to a threshold.

* * * * *